United States Patent Office 2,875,899
Patented Mar. 3, 1959

2,875,899

OIL FILTER COATING

James Allan Norton, Flint, Mich., assignor to General Motors Corporation, Detroit, Mich., a corporation of Delaware Application September 25, 1952, Serial No. 311,549

10 Claims. (Cl. 210—75)

This invention relates to improvements in the purification of oils and more particularly to the filtration of lubricating oils.

Oils employed in the lubrication of internal combustion engines become contaminated with particles of metal, dirt, lead salts, carbon and other foreign materials. These materials, often microscopic in size, if allowed to remain in the lubricating oil, will discolor the oil and cause damage to the engine either through their abrasive nature or chemical action. It is well known to filter lubricating oils in an effort to remove such contaminant particles. However, such oil filters, built into the engine itself or connected in the lubricating oil circulation system in some manner, must be rather porous in order to permit the ready passage of oil through the filter at a relatively low pressure to avoid overloading the engine oil pump. As a result, only the larger contaminant particles are removed by the filter and the smaller particles pass through the filter repeatedly.

This invention has for its principal object the improved filtration of lubricating oils. A further object is to provide an improved oil filter element. A still further object is to provide a filtration assisting coating for an oil filter medium. Other objects will more fully appear in the description which follows.

I have now discovered that a greatly improved filtration of lubricating oils is obtained when certain filtration assistants are used. According to the present invention, the preferred filtration assistants are heat-bodied oils of the type generally known as drying or semi-drying oils. By the expression "drying or semi-drying" oils, I intend to include materials usually considered as drying oils such as linseed oil and dehydrated castor oil as well as materials usually considered as semi-drying oils such as soybean and fish oils.

In general, the practice of this invention involves the use of a stabilized heat-bodied oil of the class of drying or semi-drying oil as a coating for an oil filter element. The use of such a coating, while generally improving the purification of lubricating oils by filtration, is especially effective in the removal of those contaminant particles which discolor the oil and tend to increase its viscosity. Thus the filter coating of the present invention aids not only in cleansing the oil but also in increasing the workable life of the lubricating oil.

Heat-bodying, as used in this specification, is intended to mean bodying or thickening of the oil by heating it either under a vacuum or under other nonoxidizing conditions until the desired viscosity is obtained and is to be contrasted with blowing with an oxidizing gas or gas mixture, such as air; ozonizing or other methods of bodying oils in which the oils are either partially or completely oxidized. A heat-bodied oil, suitable for use in the practice of the present invention, thus is a substantially nonoxidized oil. The improvements in the filtration of lubricating oils in accordance with the present invention are obtained using an oil which has been heat-bodied until the heat-bodied oil has a viscosity at 25° C., as measured by the Gardner-Holdt method, of at least Z-2. This method of measuring viscosity is described in Physical and Chemical Examination of Paints, Varnish, Colors and Lacquers, Gardner and Sward, 11th edition, p. 300. Very beneficial results have been obtained when the viscosity of the heat-bodied oil is within a range of between Z-2 and a viscosity just short of the gelation point of the oil. However, most satisfactory results are obtained when the viscosity of the heat-bodied oil, measured on the Gardner-Holdt scale at 25° C., is within the range of about Z-2½ to Z-4.

I have found that optimum results are obtained if the heat-bodied oil contains an added material which acts as a stabilizer, i. e., inhibits oxidation and polymerization. Illustrative of such materials are hydroquinone, 2-5 di (tertiary butyl) hydroquinone, alpha-naphthohydroquinone and 1-5 dihydroxynaphthalene. Other hydroxylated aromatics containing at least two hydroxy groups which are directly connected to aromatic nuclei also may be used. While the amount of inhibitor, of course, may be varied, I have found that very beneficial results are obtained when it is added to the heat-bodied oil in a small but effective amount which does not exceed the solubility of the inhibitor in the coating oil at the temperatures at which it is mixed with the coating oil. Most satisfactory results have been obtained when hydroquinone is used as the inhibitor and is added in an amount of about 1% by weight of the heat-bodied oil. The stabilizer may be dissolved in the heat-bodied coating oil in any desired manner. If desired, the coating oil may be heated to facilitate dissolving the inhibitor. The presence of such an oxidation inhibitor for the filtration assistant oil not only improves the storage life of such material, but also improves the effectiveness of the heat-bodied oil as a filtration assistant whether the stabilized oil is put into service immediately or a considerable time elapses before it is put into service.

While I have obtained very beneficial results with various heat-bodied oils selected from the class of drying and semi-drying oils, for example, a heat-bodied linseed oil such as the commercially available heat-bodied linseed oil known as Alinco Z-3, in the presently preferred embodiment of the invention, I use a heat-bodied soybean oil. A heat-bodied soybean oil of the type especially suitable for use in the practice of the present invention will have substantially the following characteristics:

Acid number _____ 4 to 6
Saponification number _____ 190 to 196
Iodine number _____ 100 to 110
Gardner-Hold viscosity at 25° C _____ Z-2 to Z-3

Thus, in the preferred embodiment of the invention, the filtration assistant coating consists essentially of a stabilized heat-bodied soybean oil having a viscosity, measured on the Gardner-Holdt scale at 25° C., of about Z-2½ to Z-3, said coating being stabilized with about 1% by weight of hydroquinone.

As used in the appended claims, a fibrous filter medium is intended to include any suitable fiber base oil filter medium such as a paper filter medium as used in conventional oil filters, a cloth filter element, a cotton waste filter element, mineral wool or any other oil penetrable fibrous material whether in the form of a shaped filter element, sheets or rolls of filter material. While beneficial results are obtained when the coating oil is applied to an untreated filter element, most satisfactory results have been obtained when the stabilized heat-bodied oil is applied as a coating for an oil filter element which previously has been impregnated with a thermosetting resin and the resin converted to an insoluble state. Any thermosetting resin which can be converted to an insoluble state without rendering the filtering medium impervious to the oil to be filtered or otherwise damaging the filter element may be used. The thermosetting resin generally may be converted to an insoluble state by heating although other curing methods which do not adversely affect the filter medium also may be used. Such an impregnating treatment provides a filter medium which not only is resistant to water and crankcase acids but is also stronger and more flexible. If desired, instead of applying the filtration assisting coating oil to an untreated or to a resin-impregnated filter medium, the coating oil also may be mixed with a thermosetting resin and the resulting oil-resin mixture utilized as a coating for a filter element. In such an application, the thermosetting resin may be cured in situ as by heating, chemical treatment or any other suitable curing method.

It is thought that the filtration assisting coating of the present invention improves filtration by causing the microscopic contaminant particles, which otherwise pass through the filter, to coalesce into particle clusters which are large enough to be retained by the filter and hence, removed from the oil. The filtration assistant of the present invention, when used as an oil filter coating, causes the formation of filterable particle clusters. While this action improves the filtration of any lubricating oil it is especially beneficial in the case of oils which contain detergents because the detergents tend to coat the microscopic contaminant particles with a film which prevents the agglomeration of these particles into filterable clusters. The filter coating oil of the present invention is thought to overcome this effect of the detergent by uniting the unfilterable contaminant particles into an agglomerate which is large enough to be filtered but is smaller than clearances normally found between moving parts of the engine.

In a practical application of the filter coatings of this invention, I have found that very beneficial results are obtained, using a paper filter element suitable for use in a passenger car and having a filtering area of 450 to 750 square inches, when the element is coated with about 4 to 20 grams, 12 grams preferred, of the stabilized heat-bodied oil. With a larger paper filter element, for example, one suitable for use in trucks or with diesel engines, having, for example, a filtering area of about 966 square inches, very beneficial results are obtained using about 10 to 40 grams, 20 grams preferred, of the stabilized heat-bodied oils.

In the preferred embodiment of the invention, using a heat-bodied soybean oil, such as the commercially available material known as OKO S-70 High Acid Soya, stabilized with hydroquinone, with a paper filter medium, the coating is most effective when it is applied to the filter medium in an amount equal to about 6.7% to 16.7% by weight of the paper in the filter medium. While, at times, it may be desirable to use a greater amount of coating oil in providing a safety factor to allow for variations in processing, the use of a greater amount of heat-bodied soybean oil does not continue to improve the effectiveness of the filtration.

The presently preferred method of applying the filtration assisting coating to a pre-formed filter element comprises the steps of first warming the coating oil to about 150° F., for ease in handling, and then injecting the desired amounts within the filter element which is rotating at a speed of approximately 800 R. P. M. so that the centrifugal force provides a uniform coating on the inner surface of the filter element.

The filtration assistant coating also may be applied by immersing a filter medium in a solution of coating oil dissolved in a solvent. To illustrate how the above mentioned preferred amounts of coating oil may be applied to filter elements, in this manner, I have found that by immersing a paper filter element having a filtering area of 574 square inches in a solution containing 15% by weight of a heat-bodied stabilized oil dissolved in oleum spirits, kerosene top fractions, etc. the element will, after draining for about 5 to 30 minutes, retain about 70 to 90 grams of the solution. After heating the element, for example, to about 250° F. for one-half to one hour, to drive off the solvent, there remains approximately 10 to 14 grams of the oil on the filter element. Using a larger paper filter element having, for example, 966 square inches of filtering area, 125 to 150 grams of the above mentioned solution of coating oil will be retained and, after drying, approximately 20 grams of the coating oil will remain on the filter element. A more highly concentrated solution of the filtration assistant may be used if the element is spun about its axis before drying to remove some of the solution which would otherwise remain after draining.

The following is a specific and illustrative example of a method of forming a coated oil filter element embodying the invention. An oil penetrable paper filter element is first impregnated with uncured phenol-formaldehyde resin. The resin-impregnated filter element, after being heated to drive off any solvent, is formed into the desired shape. The phenol-formaldehyde resin is then cured in situ by heating the shaped, impregnated filter element until the resin is converted into an insoluble state. The filter element is then coated with a stabilized, heat-bodied soybean oil having a viscosity, measured on the Gardner-Holdt scale at 25° C., of about Z–2½ to Z–3. It is preferred to apply the heat-bodied stabilized soybean oil in a solvent free manner by heating the soybean oil to about 150° F. and then applying it to the interior of the shaped filter element by a centrifugal coating process.

The resin-inmpregnated filter may also be coated in a solvent-free manner by applying the coating to the interior of the shaped filter element by injecting the stabilized heat-bodied oil through a nozzle having openings suitably spaced to provide a uniform coating. By applying the coating oil in a solvent-free manner, no further treatment of the element is necessary. However, if it is desired to apply the coating oil by immersion of the filter element in a solution of coating oil in oleum spirits or other solvent, it is desirable to drain the elements from 5 to 30 minutes after immersion and then to oven dry them for about one hour at about 250° F. before they are packaged.

It is to be understood that, although the invention has been described with specific reference to particular embodiments thereof, it is not to be so limited since changes and alterations therein may be made which are within the full intended scope of this invention as defined by the appended claims.

I claim:

1. The method of purifying lubricating oils by filtration which comprises passing the oil to be filtered through a filter medium having a coating of a stabilized, heat-bodied, substantially non-oxidized oil selected from the class of drying and semi-drying oils, said heat-bodied oil having a Gardner-Holdt viscosity at 25° C. of between Z–2 and its gelation point.

2. The method of filtering lubricating oils which includes the step of passing the oil to be filtered through a resin-impregnated filter element, said impregnated element being coated with a stabilized heat-bodied oil selected from the class of drying and semi-drying oils and with a Gardner-Holdt viscosity at 25° C. of between Z–2 and its gelation point.

3. An oil penetrable oil filter element comprising a fibrous filter medium having a coating of a substantially non-oxidized oil selected from the group consisting of the drying and semi-drying oils which has been thickened by heating under non-oxidizing conditions to a Gardner-Holdt viscosity at 25° C. of between Z–2 and its gelation point and which contains a small but effective amount of an oxidation inhibitor to retard the oxidation of said oil.

4. An oil penetrable oil filter element as set forth in claim 3 wherein the substantially non-oxidized oil has a Gardner-Holdt viscosity at 25° C. of from Z-2½ to Z-4.

5. An oil penetrable oil filter element as set forth in claim 3 wherein the fibrous filter medium comprises a resin-impregnated paper.

6. An oil penetrable oil filter element as set forth in claim 3 wherein the oxidation inhibitor is hydroquinone.

7. An oil penetrable oil filter element as set forth in claim 3 wherein the substantially non-oxidized oil is linseed oil.

8. An oil penetrable oil filter element as set forth in claim 3 wherein the substantially non-oxidized oil is soybean oil.

9. An oil penetrable oil filter element as set forth in claim 3 wherein the substantially non-oxidized oil is soybean oil and wherein the weight of said oil is from 6.7% to 16.7% of the weight of the filter medium.

10. An oil penetrable oil filter element as set forth in claim 3 wherein the substantially non-oxidized oil is soybean oil having an acid number of from 4 to 6, a saponification number of from 190 to 196, and an iodine number of from 100 to 110, and wherein the oxidation inhibitor is hydroquinone.

References Cited in the file of this patent

UNITED STATES PATENTS

| | | |
|---|---|---|
| 1,006,070 | Durbrow | Oct. 17, 1911 |
| 1,434,154 | San | Oct. 31, 1922 |
| 1,547,712 | Zoul | July 28, 1925 |
| 1,720,992 | Barrett | July 16, 1929 |
| 1,791,057 | Gill | Feb. 3, 1931 |
| 1,987,467 | Crupi | Jan. 8, 1935 |
| 1,989,728 | Zorn et al. | Feb. 5, 1935 |
| 2,019,241 | Weiss | Oct. 29, 1935 |
| 2,041,728 | Schneider | May 26, 1936 |
| 2,103,572 | Wells | Dec. 28, 1937 |
| 2,214,326 | Gregory | Sept. 10, 1940 |
| 2,317,487 | Schuelke | Apr. 27, 1943 |
| 2,343,428 | Wells et al. | Mar. 7, 1944 |
| 2,343,429 | Wells et al. | Mar. 7, 1944 |
| 2,411,660 | Manning | Nov. 26, 1946 |
| 2,435,734 | Bray et al. | Feb. 10, 1948 |
| 2,453,188 | Blume et al. | Nov. 9, 1948 |
| 2,607,745 | Magoffin | Aug. 19, 1952 |

FOREIGN PATENTS

| | | |
|---|---|---|
| 12,179 | Great Britain | of 1887 |
| 665,994 | Great Britain | Feb. 6, 1952 |
| 45,904 | Sweden | Mar. 12, 1917 |

OTHER REFERENCES

"Fly Papers," Manufacturing Chemist, April 1937, page 116.

Turner: "Condensed Chemical Dictionary," 4th ed., New York, Reinhold, 1950, pages 619 and 620.